(No Model.)
J. DÜRKOOP.
CHURN.
No. 323,861. Patented Aug. 4, 1885.
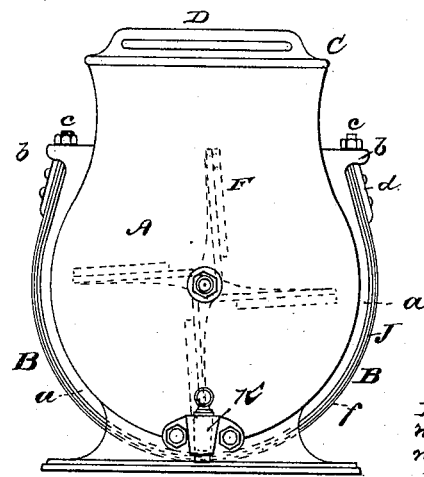
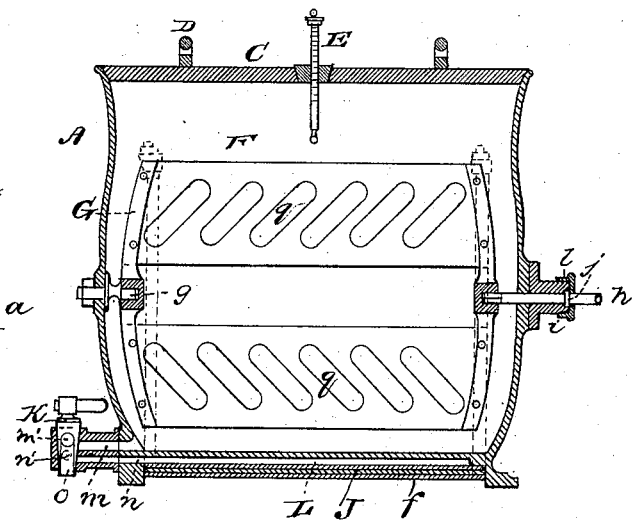
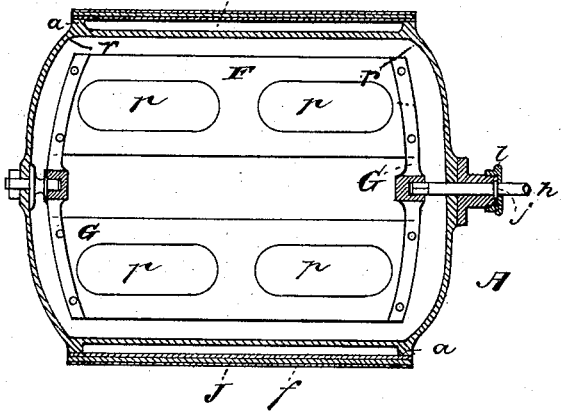
Attest:
F. F. Campbell
Oscar A. Michel
Inventor:
John Dürkoop
by Drake & Co.
attys.

UNITED STATES PATENT OFFICE.

JOHN DÜRKOOP, OF BRUNSWICK, GERMANY.

CHURN.

SPECIFICATION forming part of Letters Patent No. 323,861, dated August. 4, 1885.

Application filed September 13, 1884. (No model.) Patented in Germany January 29, 1879, No. 6,920, and in France February 5, 1880, No. 134,920.

*To all whom it may concern:*

Be it known that I, JOHN DÜRKOOP, a citizen of the German Empire, residing at Brunswick, Germany, have invented certain new and useful Improvements in Churns, (for which I have obtained a patent in Germany, bearing date January 29, 1879, No. 6,920, and in France, February 5, 1880, No. 134,920;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in churns; and, consists in the construction and combination of parts substantially as will be hereinafter set forth, and finally embodied in the clauses of the claims.

The purpose of my invention is to make the very finest quality of butter from fresh milk, or that which is sweet and untainted by the mixed flavors acquired by cream that has been preserved for a time; and to obtain such sweet butter from the sweet milk I employ it is necessary that the churn itself and all the parts in contact with the cream should be of such a character that they cannot absorb anything offensive or injurious to the flavor of the butter. The iron vessel I employ for my churn, having an enamel baked upon its inner surface, is now regarded as the purest and cleanest material for culinary purposes, and, as it is impervious to the milk, it effects its object perfectly.

It is also essential to the production of the very best butter that the temperature during the churning operation should be under the most perfect control, for which purpose the churn is commonly provided with a hot-water jacket; but, as the heat is steadily radiated from the ordinary jacket, the desired temperature cannot be maintained. This radiation is especially rapid in a churn made of iron. I therefore apply a covering of felt or any suitable non-conductor to the outer surface of the water-jacket, which embraces almost all the outer surface of the vessel. These features will be fully understood by reference to the accompanying drawings, in which—

Figure 1 is an end elevation. Fig. 2 is a central longitudinal section taken vertically through said Fig. 1; and Fig. 3, a central horizontal section taken centrally through the same.

A is the vessel or body of the churn; B, the metallic jacket surrounding the bottom and sides of the vessel nearly to the top; C, the cover provided with handles D and a thermometer, E. F are the beaters; G, the two spiders joined by said beaters and arranged to be lifted out with them in the usual way. Said beaters are provided with longitudinal openings p and transverse or inclined openings q, said openings being respectively in alternating beaters. J is the non-conducting cover to the jacket B, adapted to prevent the rapid radiation of heat from the surface of the jacket, whereby the temperature of the water in the chamber between the body and said jacket is reduced prematurely and the heat thereof wasted. K is the three-way cock, and L the water-space in the jacket.

To avoid the necessity of casting a water-jacket around the vessel A, I cast bands a around the same at the ends, projecting them from the body the desired depth of the space L, and form a lug, b, at the upper end of each band for the passage of a bolt, c. This bolt is formed upon a flat strap, d, which is riveted to a sheet-iron shell to form the jacket B, and serves to draw the same into tight contact with the bands a, suitable cement or packing being first laid upon the bands to form a water-tight joint with the surrounding jacket or sheet. The felt or covering J may be secured in its place by a canvas or sheet-metal covering, f, or in any desirable way preferred. The cock K is shown near the bottom of the vessel, at one end in Fig. 2, the passages m and n, leading from the milk and water spaces, having corresponding apertures, m' and n', upon opposite sides of the plug K', and communicating with the central outlet of the plug at o. By turning the handle of the plug in one direction the milk, cream, or buttermilk may be drawn from the churn; or the water may be drawn from the jacket B by turning the handle in the opposite direction. When in its middle position, both passages are closed and the fluids prevented from escaping. One of the spiders G is provided with a round hole to receive a pivotal pin, $g$, affixed to the vessel A, and the other spider has a square hole therein to receive the angular end of a crank-shaft, $h$, which enters the other end of the churn through the journal-box $i$, and is retained in place when the dasher is turned by a collar, $j$, formed on the shaft, and a screw-cap, $l$, as will be understood upon reference to Fig. 3. The spiders G have each four radial arms, and the beaters extending between them lie parallel to the axis of the churn, and are carried downward into the milk in succession as the spiders are turned by the shaft $h$. Holes $p$ $q$, of differing shapes, are made in alternate beaters—the larger holes, $p$, being longitudinal and two in number in one beater, being made as large as convenient or practical, while the holes $q$ in the alternate beater are small slots arranged obliquely in opposite directions in the two beaters containing them. The effect of this construction is to thoroughly divide the milk into small streams as the beaters pass through it, the mass being then broken up or converted into a different course successively.

If preferred, the beaters may be formed of iron and enameled; but the facility with which the same may be perfectly cleansed obviates the necessity for such a construction, and, as the dashers have to be removed after each churning, the increased weight of dashers so constructed would render the same in a degree objectionable.

By constructing the body of the churn of cast-iron in one piece I am able to form all the internal corners without the sharp angle so common in other constructions, and thus prevent the penetration or collection of anything foul in the obscurest portions of the interior. As such parts of a large churn are very hard to reach, the shape of the corners shown in Figs. 2 and 3, and lettered $r$ in Fig. 3 renders the churn very valuable for the production of the very finest butter, the round corners preventing the lodgement of any grease or dirt, which would certainly taint the products of the churning process.

From the above it will be seen that some of the features of my invention—to wit, the enameled iron body, the water-jacket bolted thereto, and its non conducting covering—may be somewhat modified in construction without affecting their operation in the manner described. I do not limit myself, therefore, to the precise construction shown and described, but claim the same in the following manner:

1. In combination with the cast-iron churn-body A, formed with bands $a$ and lugs $b$ for the purpose set forth, the sheet-iron jacket B and straps and bolts for holding the same in place, substantially as herein shown and described.

2. The improved churn, having therein beaters F, adapted to be revolved in the milk-chamber, and having around the body A a jacket, B, held away from said body by bands $a$, whereby a water-chamber or space is formed, and a three-way cock having apertures $m'$ $n'$, which communicate with passages $m$ $n$, leading to the milk and water chambers, respectively, and the central outlet, $o$, all said parts being arranged and combined substantially as herein set forth, for the purposes stated.

3. The improved churn, combining therein the cast-iron body A, having rounded interior corners where the bottom and sides connect, and bands $a$, formed on the outer ends or edges thereof, which terminate in lugs $b$, a jacket secured on said bands and forming a water-chamber with the body A, a covering, $f$, beaters F, and a cover, all said parts being arranged and operating substantially as and for the purposes set forth.

In testimony that I claim the foregoing I have hereunto set my hand this 28th day of August, 1884.

JOHN DÜRKOOP.

Witnesses:
WILLIAM C. FOX,
JOHS. KRACKE.